United States Patent
Lindqvist et al.

(10) Patent No.: US 8,270,311 B2
(45) Date of Patent: Sep. 18, 2012

(54) METHOD FOR DETERMINING AUTOMATICALLY A FEXT/NEXT TRANSFER-FUNCTION

(75) Inventors: Fredrik Lindqvist, Älvsjö (SE); Boris Dortschy, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 598 days.

(21) Appl. No.: 12/439,951

(22) PCT Filed: Sep. 5, 2006

(86) PCT No.: PCT/SE2006/001017
§ 371 (c)(1),
(2), (4) Date: Nov. 24, 2009

(87) PCT Pub. No.: WO2008/030145
PCT Pub. Date: Mar. 13, 2008

(65) Prior Publication Data
US 2010/0208785 A1    Aug. 19, 2010

(51) Int. Cl.
*G01R 31/08* (2006.01)
*H04L 12/28* (2006.01)
(52) U.S. Cl. ........................ 370/252; 370/351
(58) Field of Classification Search .................. None
See application file for complete search history.

(56) References Cited

U.S. PATENT DOCUMENTS

| | | | |
|---|---|---|---|
| 2002/0176490 A1* | 11/2002 | Kamali et al. | 375/222 |
| 2004/0095921 A1* | 5/2004 | Kerpez | 370/351 |
| 2004/0120470 A1* | 6/2004 | Cambron et al. | 379/1.04 |
| 2004/0136405 A1* | 7/2004 | Long et al. | 370/503 |
| 2005/0105473 A1* | 5/2005 | Hausman et al. | 370/249 |
| 2007/0109974 A1* | 5/2007 | Cutillo et al. | 370/254 |
| 2007/0280339 A1* | 12/2007 | Oksman | 375/222 |

OTHER PUBLICATIONS

ITU-T G992.3 Asymmetric digital subscriber line transceivers 2 (ADSL2) (Jan. 2005), sections 8.12.3 and 8.15.1.

* cited by examiner

*Primary Examiner* — John Blanton

(57) ABSTRACT

A method of automatically determining a far-end crosstalk (FEXT) and near-end crosstalk (NEXT) transfer function in communication lines such as Digital Subscriber Lines (DSL). In a first phase, an input test signal with a known power density spectrum (PSD) covering a frequency range of interest is transmitted at the near end of line A while a received signal or noise-related quantity or PSD is measured at both the near end and far end of line B. In a second phase, transmission of the test signal is stopped, and a received signal or noise-related quantity or PSD is again measured at both ends of line B. In a third phase, the FEXT/NEXT transfer function is determined based on the measurements of the first and second phases.

12 Claims, 3 Drawing Sheets

METHOD FOR DETERMINING AUTOMATICALLY A FEXT/NEXT TRANSFER-FUNCTION

TECHNICAL FIELD

The invention relates to a method for determining automatically a FEXT/NEXT transfer function in communication lines used for data transmission such as DSL (digital subscriber lines).

BACKGROUND

DSL systems have gained an ever growing importance in digital communication and data transfer as the use of internet is expanding to all area of business and home applications. With the introduction of new applications requiring the transmission of a great amount of data a demand for broadband transmission has emerged. Transmission rate and reliability have increased in recent years and have to be improved further in order to comply with future requirements of digital communication systems. Signal to Noise Ratio (SNR) on communication lines is one of the factors that influence broadband capabilities. Crosstalk is usually a major noise generating factor in modern DSL systems such as ADSL and VDSL.

Due to for instance the imperfections in the cable, signals on one line can couple to another line resulting in an increased noise in the received signal on this line. This crosstalk between lines will when the signals are transmitted in the same direction result in far-end crosstalk (FEXT). Crosstalk signals coupled in from a transmitter to a receiver at the same side is called near-end crosstalk (NEXT). This is illustrated in FIG. 2.

For improving the broadband capabilities of communication cables and increasing the transmission rates in both downstream and upstream directions, it is vital to reduce the transmit power in order reduce the FEXT and NEXT which are the main noise generating factors. There have been many attempts for the mitigation of crosstalk. As crosstalk cancellation can not be done in each scenario, dynamic spectrum management (DSM) is an effective way of eliminating the negative impact of crosstalk.

Traditional spectrum management is done in a static way by Static Spectrum Management (SSM). Based on standardized methods to describe DSL-channels the spectral power distribution is setup once in the initialization phase of service provisioning. This setup is then kept during the complete service session. Dynamic spectrum management (DSM) tries to utilize and track the present channel conditions in order to exploit the transmission capacities in an optimum way. The basic algorithms are described by Wei Yu, George Ginis and John M. Cioffi: "Distributed Multiuser Power Control for Digital Subscriber Lines (IEEE Journal on Selected Areas in Communications, Special Issue on Twisted Pair Transmission, vol. 20, no. 5, pp. 1105-1115. June 2002) and by Raphael Cendrillon and Marc Moonen in "Iterative Spectrum Balancing for Digital Subscriber Lines (IEEE International Communications Conference (ICC), Seoul, May 2005). Raphael Cendrillon and Marc Moonen, Jan Verlinden and Tom Bostoen, Wei Yu have described "Optimal Spectrum Balancing for Digital Subscriber Lines (IEEE Transactions on Communications, pages 922-933, vol. 54, no. 5, May 2006.) By smart adjustments of the transmission parameters the system rate, reach and therefore coverage can be substantially increased. Other possible enhancements are higher line/system robustness by providing larger SNR-margins. Depending on the DSM-algorithm used different channel information is needed. For most cases the magnitude of the FEXT-transfer function is sufficient but also crucial.

In order to make use of a DSM algorithm for the reduction of crosstalk, the FEXT/NEXT transfer function has to be determined in an automatic, time and cost efficient way.

Traditionally the FEXT/NEXT transfer function will be determined by using dedicated devices (a signal generator and a network analyzer) on both cable ends. This is easily done as long the cable is on a drum and the person carrying out the measurement has access to both cable ends. In practical cases however, the cable is very long and the cable ends are not accessible either. One cable end is typically in a central office (CO) and the other cable end is at the user side connected to a customer premises equipment (CPE). When performing a traditional transfer function measurement, both cable ends have to be disconnected from the DSL modems and connected to the dedicated devices. During measuring, communication on the tested lines or disconnected cable will not be possible. All steps of measurement have to be controlled and synchronized from either side in order to obtain the required transfer function. An additional difficulty arises from the fact that the user/customer equipments are distributed in different rooms, buildings, streets, districts or cities. Therefore only very few lines can be measured in a cost efficient way. Measuring on many or all lines would require a very long time which makes this approach practically not feasible.

It is commonly known that operators have no access to FEXT/NEXT-transfer function information about their installed cable binders. This is quite natural, since measurements of these qualities can not be done automatically, according to our knowledge. Hence, they can only be made manually. However, this is extremely expensive because it
- is time consuming
- requires an educated technician with suitable equipment
- needs physical access to lines on customer side in addition to the central office
- is non-automatic
- does not allow to track changes in the transfer function over time and deployment
- involves complicated maintenance of storing information (database handling).

U.S. Pat. No. 6,205,220 suggest a method and apparatus for reducing the near-far crosstalk interference between channels in a communication system. Channels of different lengths that are disposed adjacent to each other and carrying signals at the same frequencies often create cross-talk interference in their neighbouring channels. By spectrally shaping the signals carried on shorter lines the amount of cross-talk interference generated by these lines to longer lines may be significantly reduced, resulting in a better overall performance. This may be accomplished by including spectrally shaping a signal carried on a first channel to reduce the amount of cross-talk coupling to a neighbouring second channel. The shaping of the signal carried on the first channel may also be based in part on characteristics of the second and/or first channel. The characteristics include for example the length of the channels and the transfer functions of the channels. This method concentrates on the problem of non-uniform far-end crosstalk, often referred to as "near-far FEXT" or "unequal-level FEXT" and makes use of DSM on the basis of transfer functions but the way of determining the transfer function is not addressed.

WO2005/114861 suggests the use of operational data to determine the FEXT interference induced by one line into the other DSL line. FEXT interference can be calculated using the NEXT interference measured between the two lines at the upstream ends of the loops and the downstream channel transfer function of one of the loops. Because the NEXT and transfer function constitute a linear time-invariant system, as does the FEXT interference between the lines, the NEXT interference and line transfer function can be multiplied (if in linear format) or added (if in logarithmic format) to approximate the FEXT interference between the lines. This method does not require the lines to be disconnected or the normal operation to be interrupted during measurement, but does not provide a direct measurement of FEXT transfer function, therefore the measured parameters provide only an estimated parameter of low accuracy.

Therefore it is an object of the invention to provide a method for determining the FEXT/NEXT transfer function automatically in a time and cost efficient way. A further object of the invention is to provide a method that makes it possible to determine the FEXT/NEXT transfer function by means of using for example the standardized Loop diagnostic protocol in ITU-T G.992.3/5. It is also an object of the invention to provide a measuring method that eliminates the need for use of dedicated devices.

SUMMARY OF THE INVENTION

According to a first aspect of the invention the above objects may be achieved by a method comprising the steps of
a) transmitting a test signal with a known power spectrum density (PSD or $P_A$) covering the frequency range of interest on line A at least during measuring intervals,
b) measuring a first received signal or a noise related quantity at a first or near end of line B and sending a first report of the first received signal or PSD to a central control unit,
c) measuring a second received signal or a noise related quantity at a second or far end of line B and sending a second report of the second received signal or PSD to a central control unit,
d) stopping transmission of the test signal on line A,
e) measuring a third received signal or noise related quantity at a first or near end of line B and sending a third report of the third received signal or PSD to a central control unit,
f) measuring a fourth received signal or noise related quantity at a second or far end of line B and sending a fourth report of the fourth received signal or PSD to a central control unit, and
g) determining the FEXT/NEXT transfer function on the basis of the reported data on the received signals at the central control unit wherein all steps are coordinated and controlled from a central location at the central office or customer side.

By using this method, the measuring steps for determining the NEXT/FEXT transfer function may be accomplished in a fully automated way. This measurement process is controlled and coordinated by a central control unit, therefore no human personal is needed. The speed of obtaining the result of the measurement depends only on the measuring cycles and the data transfer rate in the reporting cycles. The calculation cycles are performed by the central control unit providing very short calculation cycles relative to the measuring and reporting cycles therefore it may be neglected. DSL modems with Double Ended Line Test (DELT) functionality on the central office (CO) and user or customer premises equipment CPE side will provide the possibility of generating and measuring a test signal and sending a report on the measuring result to the central control unit, which eliminates the need for any dedicated device.

In another aspect of the invention the method may be accomplished by measuring noise related quantities, wherein step b) comprises the measuring of PSD $QLNNE_B^{Phase1}$ at a first or near end of line B,
step c) comprises the measuring of PSD $QLNFE_B^{Phase1}$ at a second or far end of line B,
step e) comprises the measuring of PSD $QLNNE_B^{Phase2}$ at a first or near end of line B,
step f) comprises the measuring of PSD $QLNFE_B^{Phase2}$ at a second or far end of line B, and
step g) comprises determining FEXT transfer function according to $$|H_{AB}|^2 = \frac{QLNFE_B^{Phase1} - QLNFE_B^{Phase2}}{P_A} \quad (1)$$

and determining NEXT transfer function according to $$|G_{AB}|^2 = \frac{QLNNE_B^{Phase1} - QLNNE_B^{Phase2}}{P_A} \quad (2)$$

where $P_A$ is the known power spectral density (PSD) on line A.

According to a second aspect of the invention the method may be accomplished by measuring other noise related quantities, in which
step b) comprises the measuring of SNR $SNRNE_B^{Phase1}$ at a first or near end of line B,
step c) comprises the measuring of SNR $SNRFE_B^{Phase1}$ at a second or far end of line B,
step e) comprises the measuring of SNR $SNRNE_B^{Phase2}$ and a noise signal or PSD $\sigma_{NE-B,eff}^2(f)$ at a first or near end of line B,
step f) comprises the measuring of SNR $SNRFE_B^{Phase2}$ and a noise signal or PSD $\sigma_{FE-B,eff}^2(f)$ at a second or far end of line B, and
step g) comprises determining FEXT transfer function according to $$|H_{AB}(f)|^2 = \frac{1}{P_A(f)} \cdot \left[ \sigma_{FE-B,eff}^2(f) \cdot \frac{SNRFE_B^{Phase2}(f)}{SNRFE_B^{Phase1}(f)} - \sigma_{FE-B,eff}^2(f) \right] \quad (3)$$

$$|G_{AB}(f)|^2 = \frac{1}{P_A(f)} \cdot \left[ \sigma_{NE-B,eff}^2(f) \cdot \frac{SNRNE_B^{Phase2}(f)}{SNRNE_B^{Phase1}(f)} - \sigma_{NE-B,eff}^2 \right] \quad (4)$$

According to a third aspect of the invention the method may be accomplished by measuring other noise related quantities, wherein
step b) comprises the measuring of SNR $SNRNE_B^{Phase1}$ at a first or near end of line B,
step c) comprises the measuring of SNR $SNRFE_B^{Phase1}$ at a second or far end of line B,
step e) comprises the measuring of SNR $SNRNE_B^{Phase2}$ and a signal or PSD $PSD_{NErec-B}(f)$ at a first or near end of line B,
step f) comprises the measuring of SNR $SNRFE_B^{Phase2}$ and a signal or PSD $PSD_{FErec-B}(f)$ at a second or far end of line B, and
step g) comprises determining FEXT transfer function according to $$|H_{AB}(f)|^2 = \frac{PSD_{FErec-B}(f)}{P_A(f)} \cdot \left[\frac{1}{SNRFE_B^{Phase1}(f)} - \frac{1}{SNRFE_B^{Phase2}(f)}\right] \quad (5)$$

$$|G_{AB}(f)|^2 = \frac{PSD_{NErec-B}(f)}{P_A(f)} \cdot \left[\frac{1}{SNRNE_B^{Phase1}(f)} - \frac{1}{SNRNE_B^{Phase2}(f)}\right] \quad (6)$$

When using a DSL compliant test signal which covers the DSL upstream and downstream sub channels, the NEXT/FEXT transfer function for all these sub channels may be determined.

When using for example the ITU-T G992.1/3/5 REVERB, SEGUE or similar signal as a test signal, many or all sub channels may be examined at the same time which results in an enormous decrease of the measuring time compared to using only one carrier at the same time. Otherwise the steps a) to g) are repeated for all frequencies used in a DSL communication as a subcarrier frequency.

According to a further aspect of the invention, the tests are carried out on all of the line pairs of interest in a manner that in a first cycle line A remains the same while line B is selected sequentially from the remaining lines and in a second cycle line A is replaced with one of the remaining lines in sequence.

According to another aspect of the invention, the tests are carried out on all of the line pairs of interest in a manner that in a first cycle line A remains the same while all of the remaining lines as line B are selected in parallel for performing the measurement steps and in a second cycle line A is replaced with one of the remaining lines in sequence.

According to a still further aspect of the invention, the tests are carried out on all of the line pairs of interest in a manner that at least two line pairs are tested at the same time using test signals on lines A with non overlapping frequencies or frequency ranges. When performing measurement on different line pairs in parallel, the overall measuring time can be further decreased, if measurement results for possibly non-used frequencies are estimated by means of interpolation.

In order to increase accuracy of the measurements, the measurements can be repeated and the FEXT/NEXT transfer function can be determined by means of averaging.

It is also possible with the method of the invention that the measurements are performed and reported on at least one line B by means of the ITU-T G.992.3 and G.992.5 Loop Diagnostic (DELT) or similar line test protocols.

Further objects and advantages of the invention will be described in more detail with reference to the accompanying drawing.

DETAILED DESCRIPTION OF THE INVENTION

Figure 1:
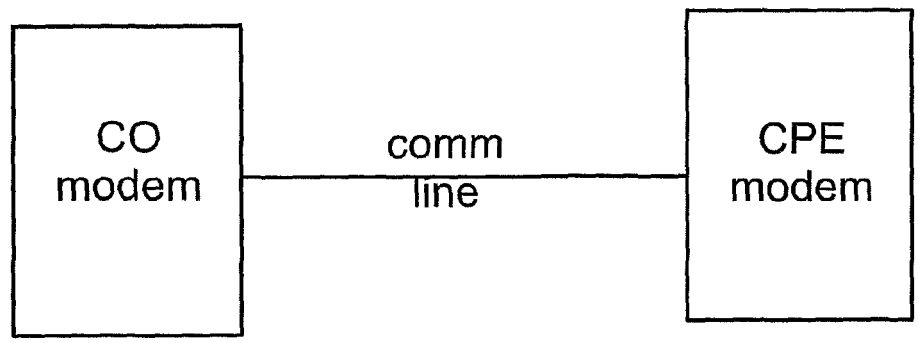
FIG. 1 is a schematic diagram of a DSL system with the main components used in the method.

Referring first to FIG. 1, a typical DSL (digital subscriber line) system can be seen with a communication line between a CO (central office) modem and a CPE (customer premises equipment) modem. For example, according to ITU-T G.992.1 Annex A the communication on an ADSL line is separated into voice communication in a frequency band up to 4 kHz and into two digital communication bands for upstream data communication (25 kHz to 138 kHz) and downstream data communication (138 kHz to 1104 kHz). These communication channels are divided into N=255 sub channels with centre frequencies being a multiple of 4,3125 kHz also called subcarriers. The use of sub channels or bins will be achieved by a transmission system using the principles behind Orthogonal Frequency Division Multicarrier (OFDM). In ITU-T G.992.1/3/5 and G.993.1/2, the modulation method is called Discrete Multi-Tone (DMT) and is similar to OFDM. Using DMT is useful since it allows the communications equipment (user modem and central office modem) to select only bins which are usable on the line thus effectively obtaining the best overall bit rate from the line at any time. With DMT, a combined signal containing many frequencies (for each bin) is transmitted through the line in both upstream and downstream direction. Fast Fourier Transform (FFT) and Inverse Fast Fourier Transform (IFFT) are used to convert the signal on the line into the individual bins. The bits in each bin are encoded by Quadrature Amplitude Modulation (QAM) in order to increase Signal to Noise Ration and reduce transmission errors. During start-up the DMT system measures the Signal to Noise Ratio of the individual sub channels and assigns different numbers of bits to each subchannel (carrier) in order to maximize performance. This process is known as adaptive bitloading. A subchannel with low SNR is assigned a small number of bits or no bits and a subchannel with a high SNR is assigned many bits. This technique is robust in a typical DSL scenario where the line conditions are unknown and slowly time-varying. Digital communication systems with higher bitrates are proposed by ITU-T G.992.3 (ADSL2) with bitrates up to 12 Mbit/s and G.992.5 (ADSL2+) with bitrates up to 24 Mbit/s. ITU G.993.1/2 describes very high speed digital subscriber line transceivers (VDSL/VDSL2) with bitrates up to more than 50 Mbit/s.

A communication line is typically an unshielded twisted pair of copper wires used in telephone cables, however it may for example also be a shielded wire, a coaxial cable, or an optical cable. Communication cables used in a DSL system enable a bidirectional communication with a frequency division system and/or echo cancelled system and a multi carrier modulation as described above.

Figure 2:
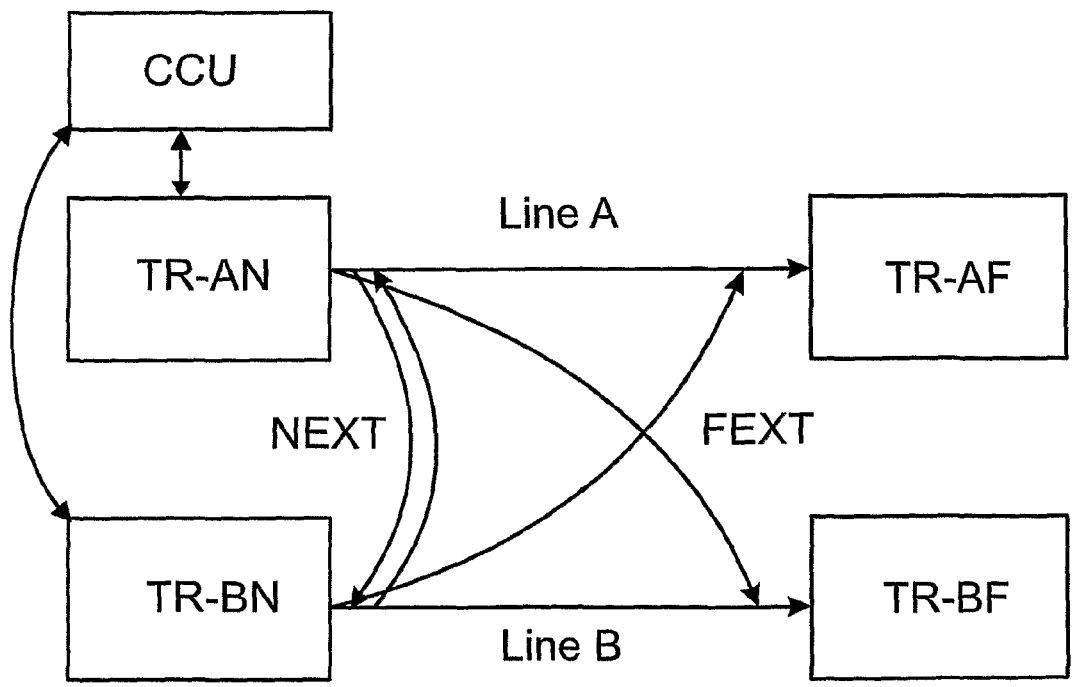
FIG. 2 is a schematic diagram of the measurement of FEXT/NEXT transfer function on a pair of communication lines.
Figure 3:
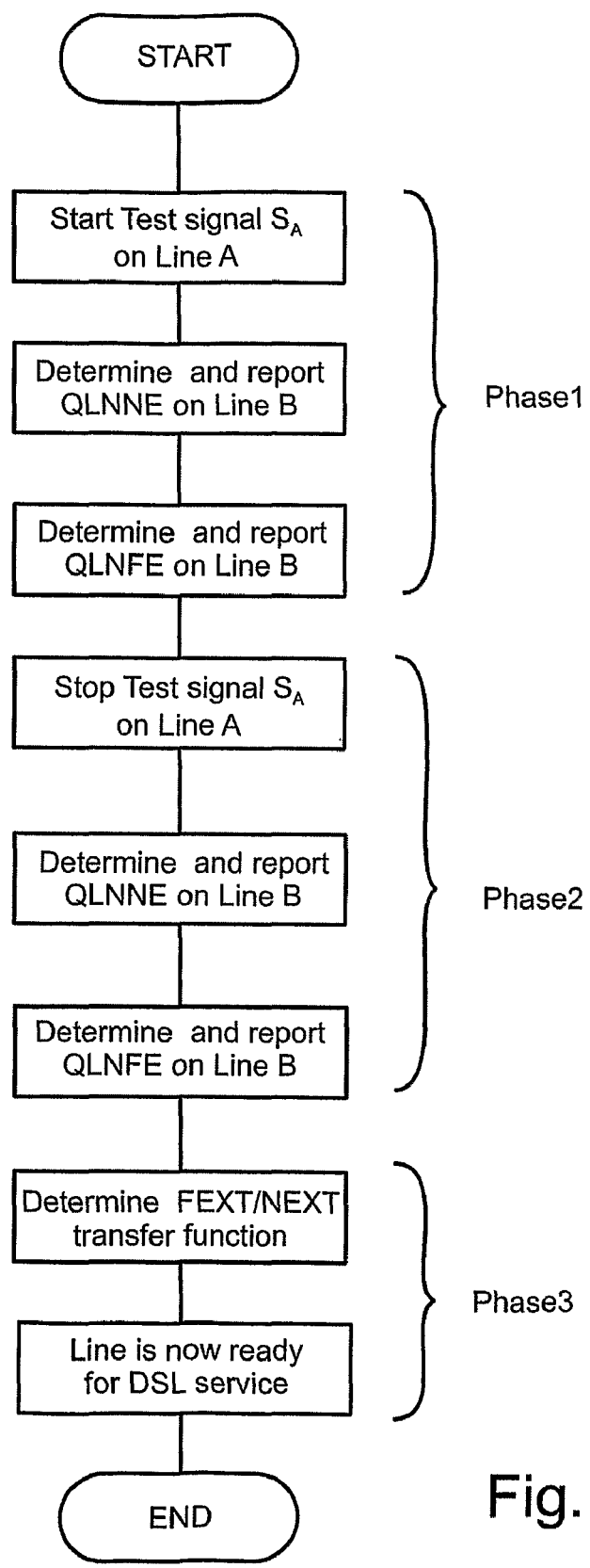
FIG. 3 is a schematic diagram of the steps during determining the FEXT/NEXT transfer function.
Figure 4:
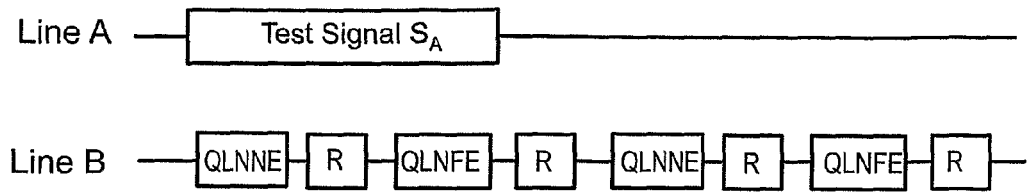
FIG. 4 is a timing diagram for carrying out the measurement on two communication lines.

FIG. 2 illustrates the principle structure for carrying out measurements for determining the NEXT/FEXT transfer function. A DSL modem typically consists of a transmitter and a receiver connected to the subscriber line's twisted pair through a so called hybrid circuit. On the CO side the near end transmitters and receivers TR-AN and TR-BN and on the CPE side the far end transmitters and receivers TR-AF and TR-BF are shown. Both transmission lines Line A and Line B are of similar structure, e.g. unshielded twisted pair of copper wires. One of the transmission lines, for example Line A, is the "active" line. The central office CO side of the active line is connected to a first transmitter TR-AN which generates a test signal that is applied to the first line Line A in a first measuring cycle or phase 1. While transmitting the test signal $S_A$ through the first line the second line is free of any test or communication signal. A noise measurement is than carried out on this second passive or quiet line indicated as Line-B at both ends of the cable. After obtaining a noise value QLNNE on the near end or CO side and a noise value QLNFE on the far end or CPE side, these values are reported to a central control unit. The central control unit receives the measured values, makes the necessary calculations and coordinated the whole process of measurement.

In a second measuring cycle or phase 2 the test signal $S_A$ is switched off so that the first line Line A is "silent". While both the first line and the second line are silent, that is free of any test or communication signal, a noise measurement is carried out on the second passive or quiet line indicated as Line B at both ends of the cable. After obtaining a noise value QLNNE on the near end or CO side and a noise value QLNFE on the far end or CPE side, these values are reported to a central control unit.

In a third cycle or phase 3 the NEXT and FEXT transfer functions will be determined by the central control unit which performs the necessary calculation on the received and stored values of the preceding noise measurements. After having determined the NEXT and FEXT transfer functions, the line is ready for DSL service.

If only one subcarrier frequency is used in the test signal at a time, then the measurement cycles phase1 to phase3 have to be repeated for all subcarrier frequencies. Therefore it is very advantageous to use a so called reverb signal, a multi-carrier signal, which contains all the subcarrier frequencies at the same time with substantially the same amplitude but with a different phase, which remains constant during measurement. This means that the received signal will contain a so called line-spectrum, or in other words, the carriers remain orthogonal to each other which is very beneficial for this application.

Figure 5:
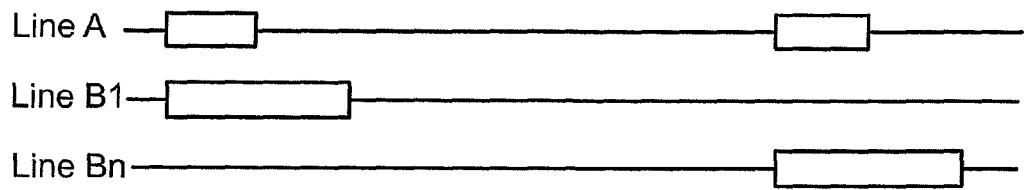
FIG. 5 is a timing diagram for carrying out the measurement on several communication lines in a sequence.
Figure 6:
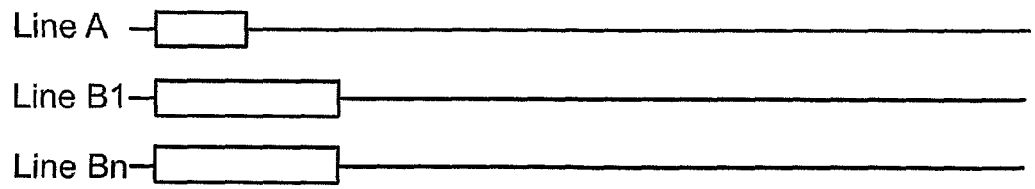
FIG. 6 is a timing diagram for carrying out the measurement on several communication lines in parallel.
Figure 7:
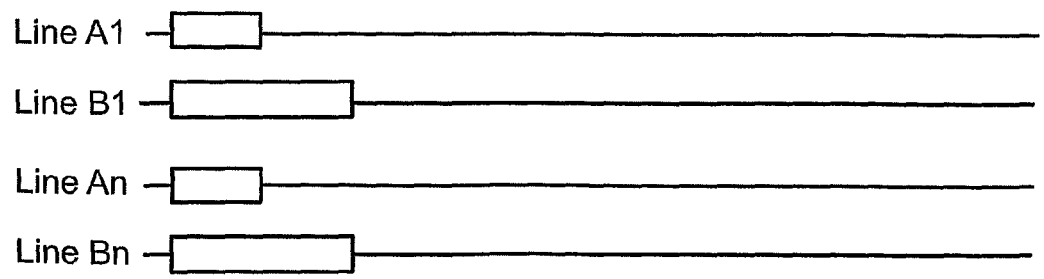
FIG. 7 is a timing diagram for carrying out the measurement on several communication line pairs in parallel.

Different measuring scenarios are illustrated in FIGS. 5 to 7.

According to one aspect of the invention the steps (phase 1 to phase 3) for determining the FEXT/NEXT transfer function are performed for a multiple of lines B1 to Bn in sequence while line A remains the same and then a new Line A is selected. (FIG. 5) In this case only two communication lines are excluded from normal traffic during determining the FEXT/NEXT transfer function.

According to another aspect of the invention, the steps (phase 1 to phase 3) for determining the FEXT/NEXT transfer function are performed for a multiple of lines B1 to Bn in parallel while line A remains the same and then a new line A is selected. (FIG. 6) This example provides a very short measuring cycle, however during measuring all communication lines A and B1 to Bn are excluded from traffic.

According to a third aspect of the invention, the steps (phase 1 to phase 3) for determining the FEXT/NEXT transfer function are performed for a multiple of line pairs A1 B1 to An Bn in parallel with a test signal $S_{A1}$ to $S_{An}$ wherein the test signals are signals with non overlapping frequencies or frequency ranges. (FIG. 7) This way the efficiency of the measurement may be further increased by means of interpolation, but again all communication lines under test are excluded from normal traffic.

In another embodiment of the invention, the steps (phase 1 to phase 3) for determining the FEXT/NEXT transfer function are repeated several times and an average of the determined FEXT/NEXT transfer functions is generated.

It is of further advantage to use test signals and measuring means defined by standards. Line tests can be carried out according to the single ended line test SELT or the double ended line test DELT specification.

Double Ended Line Test (DELT) measurement consists of a standardized broadband measurement procedure, specified by ITU-T and referred to as Loop Diagnostics. Both the far-end and the near-end modems require support for Loop Diagnostics.

The DELT subscriber line measurement is performed from both ends of the cable for the purpose of DSL qualification, fault localization and diagnosing.

The following parameters are measured per frequency (subcarrier) from both ends of the cable, i.e. upstream and downstream.

Hlin: The ITU-T standard G.992.3/G.992.5 defines a complex-valued channel transfer function H(f), measured per subcarrier.

Hlog: defined in ITU-T G.997.1 as the logarithmic representation of the transfer function in dB.

Qln: Quiet Line Noise PSD per subcarrier is defined in ITU-T G.992.3/G.992.5 as the noise present in a particular subcarrier when no DSL service signal is present. The unit of this parameter is dBm/Hz. More specifically, this signal contains the following sub-signals QLN-FE: QLN measured at the far-end side, i.e. customer side QLN-NE: QLN measured at the near-end side, i.e. central-office side Snr: Signal-to-Noise-Ratio per subcarrier is defined in ITU-T G.992.3/G.992.5 as the ratio between the received signal and the received noise for a particular subcarrier (dB). The performance and reliability of the Loop Diagnostics parameters depend on the implementation of Loop Diagnostics in both the near-end and the far-end modem. This signal contains the following sub-signals SNR-FE: SNR measured at the far-end side, i.e. customer side SNR-NE: SNR measured at the near-end side, i.e. central-office side Using the DELT protocol for determining the FEXT/NEXT transfer function, the process may be even more effective.

FEXT-Transfer Function

The typical effective DSL noise environment is mainly determined by the combination of natural background noise and FEXT, For a specific frequency f and for a specific line j this can be described by $$\sigma_{j,\mathit{eff}}^2(f) = \sigma_{j,0}^2(f) + \sigma_{j,FEXT}^2(f)$$

The FEXT noise on line j is the accumulation of the individual crosstalk contribution from the other lines $$\sigma_{j,FEXT}^2(f) = \sum_{i=1, i \ne j}^{N} P_i(f) \cdot |H_{ij}(f)|^2$$

The number of FEXT-disturbers is N−1. Here, $P_i(f)$ denotes the transmit power (spectral density) on line i and $|H_{ij}(f)|^2$ denotes the (squared magnitude of the) FEXT-cross-transfer function from line i to line j.

Practically, there is no difference made between the different contributions to noise $\sigma_{\mathit{eff}}^2(f)$. For the sake of readability the explicit frequency dependence notation is omitted in the following description.

The procedure for the determination of the FEXT-transfer function from line A to line B is as follows:

1. Make sure line A and B are down, i.e. stop data transmission. This is only necessary while performing DELT and to be able to transmit defined signals on line A.

Phase 1

2. Start transmitting a signal with predefined PSD on line A. Note that by utilising a Reverb-like signal, as standardized in ITU-T G.992.1, the procedure is simplified and is automatically in line with the DELT protocol.

Practically, by using instead the show time signal on line A the data traffic can be uninterrupted, but lower measurement accuracy is expected. This could however be compensated for by averaging via repetition of step 3.

3. Perform DELT on line B.
4. When DELT has finished, retrieve DELT-QLN information, denoted as $QLNFE_B^{Phase1}$, about QLN-FE on line B, i.e. the measured QLN at the customer side.

Phase 2

5. Stop sending a signal on line A.
6. Perform DELT on line B.
7. When DELT has finished, retrieve DELT-QLN information, denoted as $QLNFE_B^{Phase2}$, about QLN-FE on line B, i.e. the measured QLN at the customer side.

Phase 3

All necessary measurements are now done and both line A and B are fully available for active DSL service.

The calculation of the FEXT-transfer function will now be described. The way DSL services are used makes FEXT-crosstalk properties, as for example the PSD, only slowly changing over time.

Due to this fact the difference between the measurements of $QLNFE_B^{Phase1}$ and $QLNFE_B^{Phase2}$ represents the (controlled) FEXT contribution from line A to line B.

Since the PSD $P_A$ of the defined transmit signal used on line A is known, the crosstalk transfer function can be immediately calculated from the difference of $QLNFE_B^{Phase1}$ and $QLNFE_B^{Phase2}$. That is $$\Delta QLN = QLNFE_B^{Phase1} - QLNFE_B^{Phase2} = P_A \cdot |H_{AB}|^2$$

$$|H_{AB}|^2 = \frac{\Delta QLN}{P_A}$$

Note that this calculation is done for each used frequency (DSL-tones). The described procedure should be repeated for all line-pairs (A-B) in order to characterize all the crosstalk-transfer functions of the binder.

The practical accuracy of the estimation of $|H_{AB}|^2$ using the procedure described above is increased with a decrease of the permanent noise level, e.g. if all lines (except A and B) are not transmitting data, i.e. they are silent. In practice, this is possible to conduct for a larger number of lines during regular maintenance sessions or during the nights. This minor drawback is well motivated and compensated by the potential gains of providing this information to a DSM-based system or other expert systems aiming at optimized deployment.

NEXT-Transfer Function

The estimation of NEXT-transfer function is similar to the procedure described above in connection with the FEXT transfer function. Here, the accumulated NEXT-PSD on line j can be expressed as $$\sigma_{j,NEXT}^2(f) = \sum_{i=1, i \neq j}^{N} P_i(f) \cdot |G_{ij}(f)|^2$$

Where the number of NEXT-disturbers is N−1, $P_i(f)$ denotes the transmit power (spectral density) on line i and $|G_{ij}(f)|^2$ denotes the (squared magnitude of the) NEXT-cross-transfer function from line i to line j.

In this case, we will utilize the QLN-NE information measured during the same DELT-sessions as for the FEXT-case. Hence, the NEXT-transfer function between line A and line B can be obtained by $$\Delta QLN = QLNNE_B^{Phase1} - QLNNE_B^{Phase2} = P_A \cdot |G_{AB}|^2$$

$$|G_{AB}|^2 = \frac{\Delta QLN}{P_A}$$

The method uses standardized protocols already implemented in the systems to conduct and retrieve the NEXT/FEXT-measurement results. The method is independent of the practically existing and small differences between the sampling clock frequencies of the used lines. The method is adaptive to natural changes in line characteristics caused by temperature and aging effects, etc. The method can be implemented entirely as a software solution as well. A special advantage arises from the fact that the suggested method does not need any additional or modified equipment in a DSL system, the installed system components compliant with DSL standard can be programmed in order to perform the required measurements and transfer the result of measurement from the location of measurement to the place of data processing. The FEXT/NEXT transfer function is determined according to the invention in an automatic way and provides real time information for crosstalk suppression methods and systems.

In another embodiment of the invention the calculation of NEXT and FEXT transfer functions is based on SNR rather than only on Quiet Line Noise (QLN). In Phase 1 with a test signal on line A and Phase 2 without the test signal on line A the following SNR are measured by the far-end receiver of line B.

$$SNRFE_B^{Phase1}(f) = \frac{PSD_{FErec-B}(f)}{\sigma_{FE-B,eff}^2(f) + P_A(f) \cdot |H_{AB}(f)|^2}$$

$$SNRFE_B^{Phase2}(f) = \frac{PSD_{FErec-B}(f)}{\sigma_{FE-B,eff}^2(f)}$$

Where $PSD_{FErec-B}(f)$ is a received signal PSD for frequency f at the far-end receiver side of line B. Assuming $PSD_{FErec-B}(f)$ is the same in the both phases, after straight forward manipulations one ends up with $$|H_{AB}(f)|^2 = \qquad \text{(Eq. 1)}$$

$$\frac{1}{P_A(f)} \cdot \left[ \sigma_{FE-B,eff}^2(f) \cdot \frac{SNRFE_B^{Phase2}(f)}{SNRFE_B^{Phase1}(f)} - \sigma_{FE-B,eff}^2(f) \right]$$

$$|H_{AB}(f)|^2 = \frac{PSD_{FErec-B}(f)}{P_A(f)} \cdot \left[ \frac{1}{SNRFE_B^{Phase1}(f)} - \frac{1}{SNRFE_B^{Phase2}(f)} \right]$$

The NEXT transfer function $|G_{AB}(f)|^2$ can be calculated in a similar way by using the near-end measurement results instead of the far-end values. The involved measured signals or values are all available for example from a DELT-procedure, but could also be measured by other means.

The invention claimed is:

1. A method of determining a far-end crosstalk/near-end crosstalk (FEXT/NEXT) transfer function for a first line A and a second line B in a bundle of communication lines, said method comprising the steps of:

a) transmitting at least during measuring intervals, an input test signal $S_A$ at a near end of line A, said test signal having a known power spectrum density (PSD) covering a frequency range of interest;

b) measuring a first noise related measurement, PSD $QLNNE_B^{Phase1}$, at a first or near end of line B;

c) measuring a second noise related measurement, PSD $QLNFE_B^{Phase1}$, at a second or far end of line B;

d) stopping transmission of the test signal on line A, and thereafter:

e) measuring a third noise related measurement, PSD $QLNNE_B^{Phase2}$, at a first or near end of line B;

f) measuring a fourth noise related measurement, PSD $QLNFE_B^{Phase2}$, at a second or far end of line B; and g) determining the FEXT/NEXT transfer function on the basis of the first, second, third, and fourth measurements, wherein step g) comprises determining the FEXT transfer function according to:

$$|H_{AB}|^2 = \frac{QLNFE_B^{Phase1} - QLNFE_B^{Phase2}}{P_A} \quad (1)$$

and determining the NEXT transfer function according to:

$$|G_{AB}|^2 = \frac{QLNNE_B^{Phase1} - QLNNE_B^{Phase2}}{P_A} \quad (2)$$

where $P_A$ is the known PSD on line A;
wherein each measurement is reported to a central control unit and all steps are coordinated by the central control unit.

2. The method as recited in claim 1, wherein the communication lines are Digital Subscriber Lines (DSL), and the method includes selecting an input test signal which is DSL compliant covering the DSL upstream and downstream sub channels.

3. The method as recited in claim 2, wherein the step of selecting an input test signal includes selecting a test signal to be a REVERB or a SEGUE signal.

4. The method as recited in claim 1, wherein:
steps a) to g) are repeated for all frequencies used in a Digital Subscriber Line (DSL) communication as a sub-carrier frequency.

5. The method as recited in claim 1, wherein steps a) to g) are performed for a multiple of lines B1 to Bn in sequence while line A remains the same, and then selecting a new line A.

6. The method as recited in claim 1, further comprising the steps of:
h) repeating steps a) to g) for determining the FEXT/NEXT transfer function several times; and
i) generating an average of the determined FEXT/NEXT transfer functions.

7. The method as recited in claim 1, wherein the first, second, third, and fourth measurements are performed and reported on at least one line B by means of the ITU-T G.992.3 and G.992.5 Loop Diagnostic (DELT) line test protocols.

8. A method of determining a far-end crosstalk/near-end crosstalk (FEXT/NEXT) transfer function for a first line A and a second line B in a bundle of communication lines, said method comprising the steps of:

a) transmitting at least during measuring intervals, an input test signal $S_A$ at a near end of line A, said test signal having a known power spectrum density (PSD) covering a frequency range of interest;

b) measuring a first noise related measurement, SNR $SNRNE_B^{Phase1}$, at a first or near end of line B;

c) measuring a second noise related measurement, SNR $SNRFE_B^{Phase1}$, at a second or far end of line B;

d) stopping transmission of the test signal on line A, and thereafter:

e) measuring a third noise related measurement, SNR $SNRNE_B^{Phase2}$, and a noise signal, PSD $\sigma_{NE-B,eff}^2(f)$, at a first or near end of line B;

f) measuring a fourth noise related measurement, SNR $SNRFE_B^{Phase2}$, and a noise signal, PSD $\sigma_{FE-B,eff}^2(f)$, at a second or far end of line B; and g) determining the FEXT/NEXT transfer function on the basis of the first, second, third, and fourth measurements, wherein step g) comprises determining the FEXT transfer function according to:

$$|H_{AB}(f)|^2 = \frac{1}{P_A(f)} \cdot \left[ \sigma_{FE-B,eff}^2(f) \cdot \frac{SNRFE_B^{Phase2}(f)}{SNRFE_B^{Phase1}(f)} - \sigma_{FE-B,eff}^2(f) \right] \quad (3)$$

$$|G_{AB}(f)|^2 = \frac{1}{P_A(f)} \cdot \left[ \sigma_{NE-B,eff}^2(f) \cdot \frac{SNRNE_B^{Phase2}(f)}{SNRNE_B^{Phase1}(f)} - \sigma_{NE-B,eff}^2 \right] \quad (4)$$

wherein each measurement is reported to a central control unit and all steps are coordinated by the central control unit.

9. A method of determining a far-end crosstalk/near-end crosstalk (FEXT/NEXT) transfer function for a first line A and a second line B in a bundle of communication lines, said method comprising the steps of:

a) transmitting at least during measuring intervals, an input test signal $S_A$ at a near end of line A, said test signal having a known power spectrum density (PSD) covering a frequency range of interest;

b) measuring a first noise related measurement, SNR $SNRNE_B^{Phase1}$, at a first or near end of line B;

c) measuring a second noise related measurement, SNR $SNRFE_B^{Phase1}$, at a second or far end of line B;

d) stopping transmission of the test signal on line A, and thereafter:

e) measuring a third noise related measurement, SNR $SNRNE_B^{Phase2}$, and a signal or $PSD_{NErec-B}(f)$ at a first or near end of line B;

f) measuring a fourth noise related measurement, SNR $SNRFE_B^{Phase2}$, and a signal or $PSD_{FErec-B}(f)$ at a second or far end of line B; and g) determining the FEXT/NEXT transfer function on the basis of the first, second, third, and fourth measurements, wherein step g) comprises determining the FEXT transfer function according to:

$$|H_{AB}(f)|^2 = \frac{PSD_{FErec-B}(f)}{P_A(f)} \cdot \left[ \frac{1}{SNRFE_B^{Phase1}(f)} - \frac{1}{SNRFE_B^{Phase2}(f)} \right] \quad (5)$$

$$|G_{AB}(f)|^2 = \frac{PSD_{NErec-B}(f)}{P_A(f)} \cdot \left[ \frac{1}{SNRNE_B^{Phase1}(f)} - \frac{1}{SNRNE_B^{Phase2}(f)} \right] \quad (6)$$

wherein each measurement is reported to a central control unit and all steps are coordinated by the central control unit.

10. A method of determining a far-end crosstalk/near-end crosstalk (FEXT/NEXT) transfer function for a first line A and a second line B in a bundle of communication lines, said method, comprising the steps of:

a) transmitting at least during measuring intervals, an input test signal $S_A$ at a near end of line A, said test signal having a known power spectrum density (PSD) covering a frequency range of interest;
b) measuring a first noise related measurement or PSD at a first or near end of line B;
c) measuring a second noise related measurement or PSD at a second or far end of line B;
d) stopping transmission of the test signal on line A, and thereafter:
e) measuring a third noise related measurement or PSD at a first or near end of line B;
f) measuring a fourth noise related measurement or PSD at a second or far end of line B; and
g) determining the FEXT/NEXT transfer function on the basis of the first, second, third, and fourth measurements;
wherein each measurement is reported to a central control unit and all steps are coordinated by the central control unit; and
wherein steps a) to g) are performed for a multiple of lines B1 to Bn in parallel while line A remains the same and then selecting a new line A.

11. A method of determining a far-end crosstalk/near-end crosstalk (FEXT/NEXT) transfer function for a first line A and a second line B in a bundle of communication lines, said method comprising the steps of:
a) transmitting at least during measuring intervals, an input test signal $S_A$ at a near end of line A, said test signal having a known power spectrum density (PSD) covering a frequency range of interest;
b) measuring a first noise related measurement or PSD at a first or near end of line B;
c) measuring a second noise related measurement or PSD at a second or far end of line B;
d) stopping transmission of the test signal on line A, and thereafter:
e) measuring a third noise related measurement or PSD at a first or near end of line B;
f) measuring a fourth noise related measurement or PSD at a second or far end of line B; and
g) determining the FEXT/NEXT transfer function on the basis of the first, second, third, and fourth measurements;
wherein each measurement is reported to a central control unit and all steps are coordinated by the central control unit; and
wherein steps a) to g) are performed for a multiple of line pairs A1-B1 to An-Bn in parallel with a test signal SA1 to SAn wherein the test signals are signals with non-overlapping frequencies or frequency ranges.

12. The method as recited in claim 11, wherein the step of determining the FEXT/NEXT transfer function includes estimating the NEXT/FEXT transfer function utilizing interpolation on non-used frequencies.

* * * * *

UNITED STATES PATENT AND TRADEMARK OFFICE
CERTIFICATE OF CORRECTION

PATENT NO. : 8,270,311 B2
APPLICATION NO. : 12/439951
DATED : September 18, 2012
INVENTOR(S) : Lindqvist et al.

Page 1 of 1

It is certified that error appears in the above-identified patent and that said Letters Patent is hereby corrected as shown below:

In Column 4, Line 50, in Equation (4), delete " $\frac{SNRNE_B^{Phase2}(f)}{SNRNE_B^{Phase1}(f)} - \sigma_{NE-B,eff}^2 \Big]$ ,"

and insert -- $\frac{SNRNE_B^{Phase2}(f)}{SNRNE_B^{Phase1}(f)} - \sigma_{NE-B,eff}^2(f) \Big]$ --, therefor.

In Column 8, Line 38, delete "FEXT," and insert -- FEXT. --, therefor.

In Column 12, Line 21, in Equation (4), in Claim 8, delete " $\frac{SNRNE_B^{Phase2}(f)}{SNRNE_B^{Phase1}(f)} - \sigma_{NE-B,eff}^2 \Big]$ ,"

and insert -- $\frac{SNRNE_B^{Phase2}(f)}{SNRNE_B^{Phase1}(f)} - \sigma_{NE-B,eff}^2(f) \Big]$ --, therefor.

In Column 12, Line 44, in Claim 9, delete " $PSD_{NErec-B}(f)$ ," and insert -- $PSD_{NErec-B}(f)$ --, therefor.

In Column 12, Line 47, in Claim 9, delete " $PSD_{FErec-B}(f)$ ," and insert -- $PSD_{FErec-B}(f)$ --, therefor.

In Column 12, Line 67, in Claim 10, delete "method," and insert -- method --, therefor.

Signed and Sealed this
Twenty-second Day of January, 2013

David J. Kappos
*Director of the United States Patent and Trademark Office*